US 8,537,491 B2

(12) United States Patent
Kotaki

(10) Patent No.: US 8,537,491 B2
(45) Date of Patent: Sep. 17, 2013

(54) MAGNETIC TAPE APPARATUS AND MAGNETIC TAPE APPARATUS CONTROL METHOD

(71) Applicant: Fujitsu Limited, Kawasaki (JP)

(72) Inventor: Yoshio Kotaki, Nagano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/654,619

(22) Filed: Oct. 18, 2012

(65) Prior Publication Data

US 2013/0163109 A1 Jun. 27, 2013

(30) Foreign Application Priority Data

Dec. 27, 2011 (JP) ................................. 2011-286025

(51) Int. Cl.
*G11B 17/00* (2006.01)

(52) U.S. Cl.
USPC .......................................................... 360/88

(58) Field of Classification Search
USPC .................... 360/88, 81, 32, 137, 132, 99.02, 360/95, 94, 60
See application file for complete search history.

(56) References Cited

U.S. PATENT DOCUMENTS

| | | | |
|---|---|---|---|
| 5,517,370 A * | 5/1996 | Tanaka | 360/70 |
| 5,786,949 A | 7/1998 | Sakamoto | |
| 6,462,902 B1 * | 10/2002 | Luo et al. | 360/99.12 |
| 2006/0249607 A1 * | 11/2006 | Castronovo | 241/30 |

FOREIGN PATENT DOCUMENTS

| | | |
|---|---|---|
| JP | 53-118017 | 10/1978 |
| JP | 63-247909 | 10/1988 |
| JP | 8-180408 | 7/1996 |
| JP | 10-253109 | 9/1998 |
| JP | 10-340432 | 12/1998 |
| JP | 2001-67753 | 3/2001 |
| JP | 2004-110953 | 4/2004 |
| JP | 2004-271115 | 9/2004 |
| JP | 2007-242091 | 9/2007 |
| JP | 2009-43392 | 2/2009 |

* cited by examiner

*Primary Examiner* — Allen T Cao
(74) *Attorney, Agent, or Firm* — Staas & Halsey LLP

(57) ABSTRACT

A magnetic tape apparatus includes a first and second suction tubes, each of which couples the blade with an edge part of the roller of the roller guide, the first suction tube having a blade side opening area at a location where air is sucked by the blade during a forward rotation of a motor, a second suction tube having a blade side opening area at a location where air is sucked by the blade during the backward rotation of the motor, a shutter unit to perform opening and closing of the first and second suction tubes, and an opening and closing control unit to control the shutter unit to open the first suction tube during the forward rotation and open the second suction tube during the backward rotation.

6 Claims, 15 Drawing Sheets

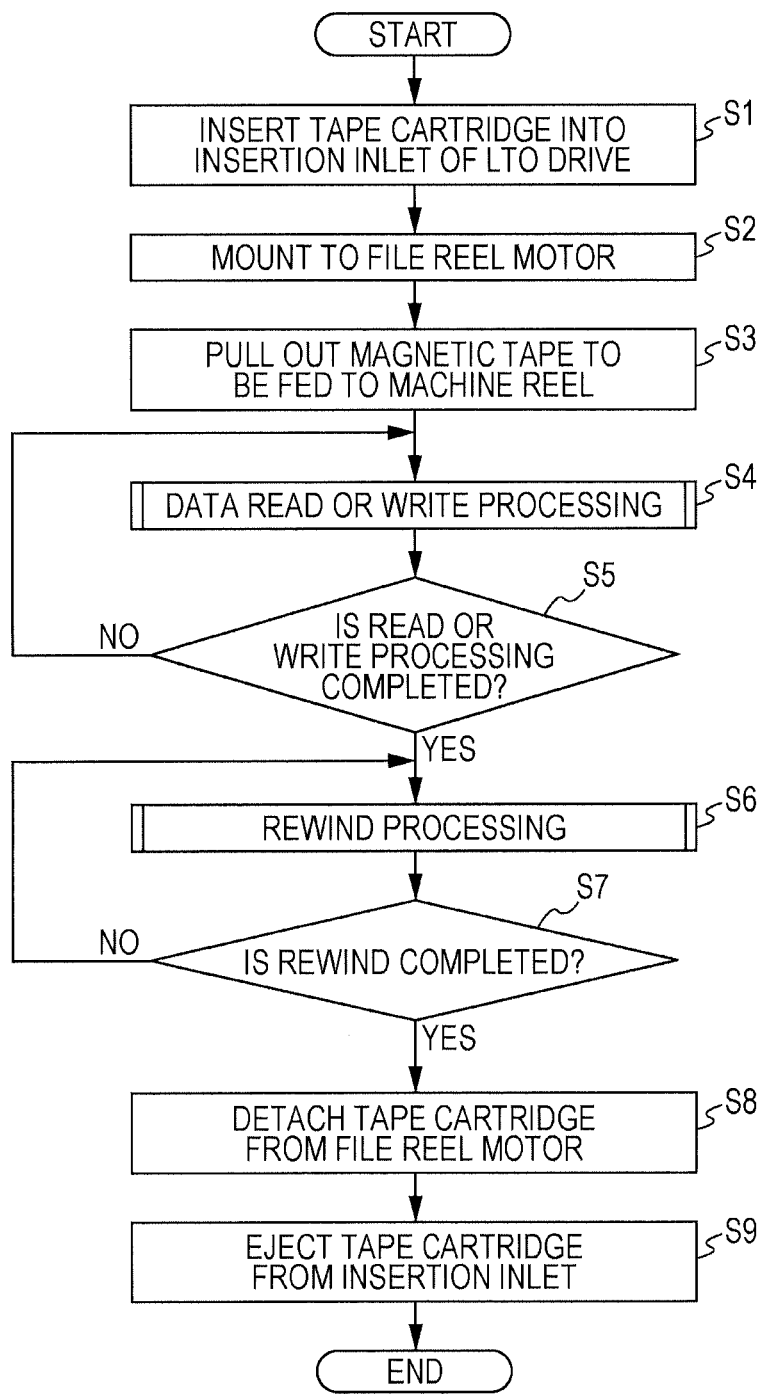

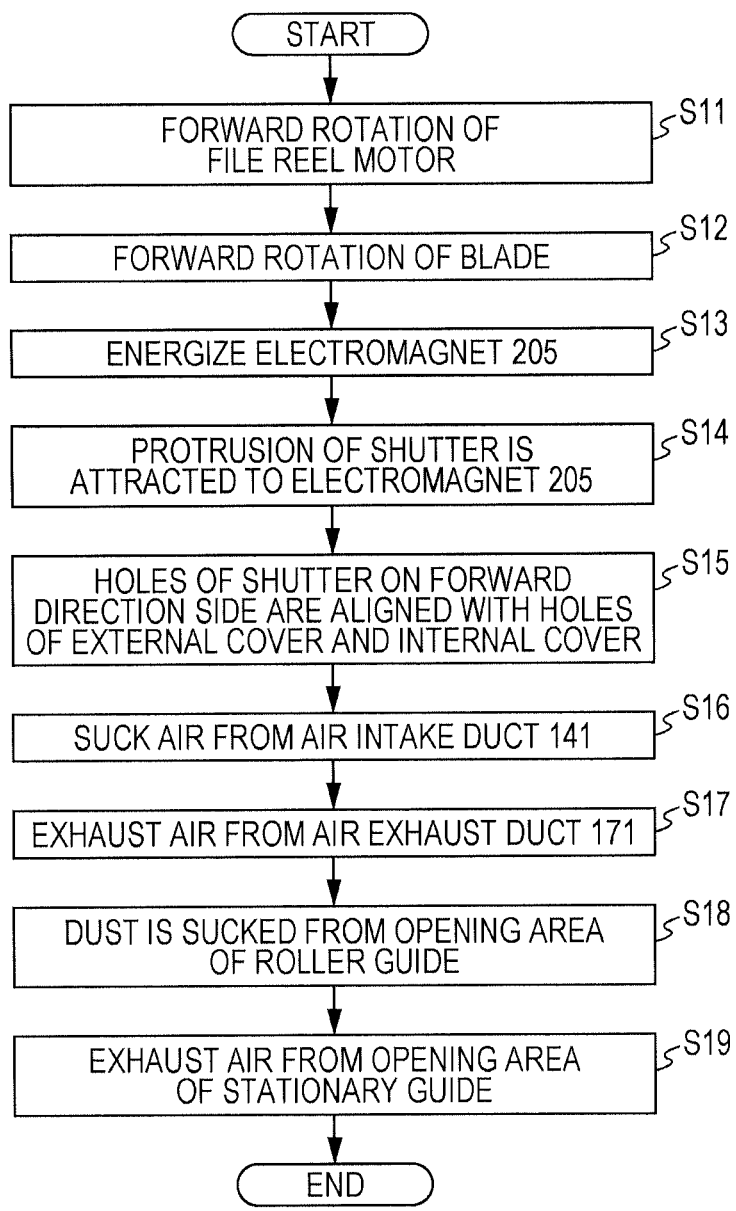

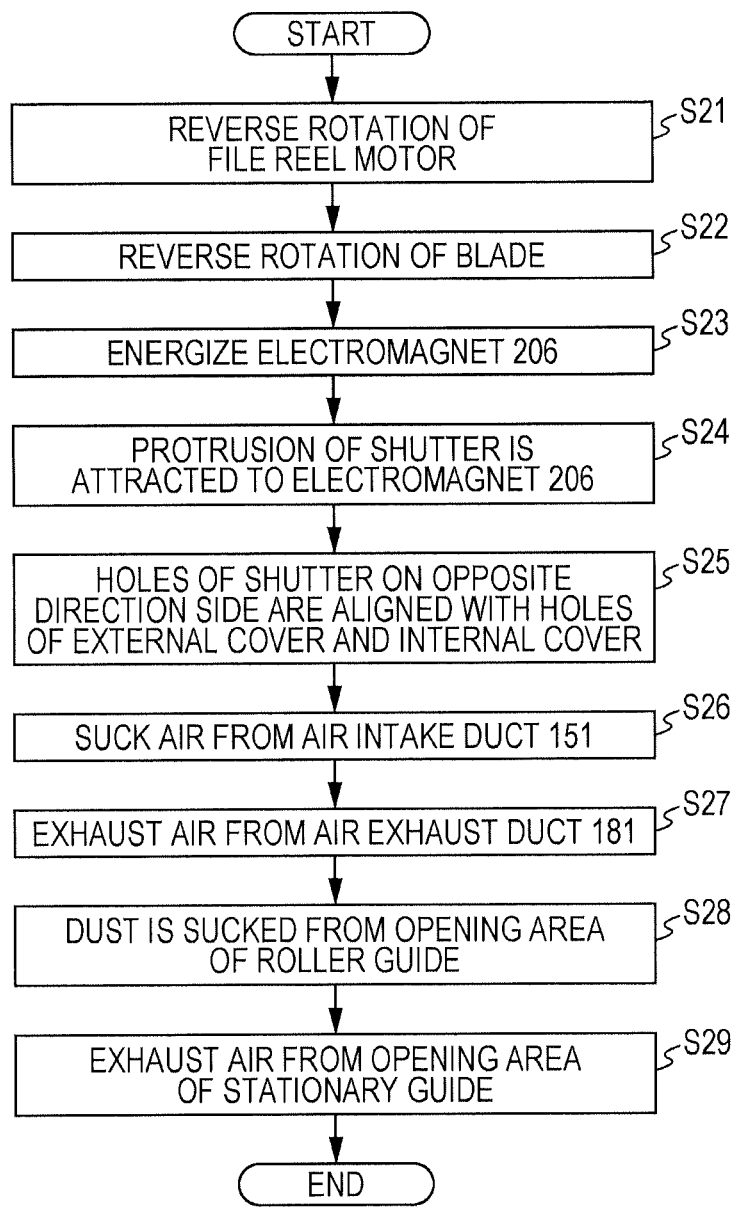

MAGNETIC TAPE APPARATUS AND MAGNETIC TAPE APPARATUS CONTROL METHOD

CROSS-REFERENCE TO RELATED APPLICATION

This application is based upon and claims the benefit of priority of the prior Japanese Patent Application No. 2011-286025, filed on Dec. 27, 2011, the entire contents of which are incorporated herein by reference.

FIELD

The embodiment discussed herein is related to a magnetic tape apparatus and a magnetic tape apparatus control method.

BACKGROUND

A magnetic tape is widely used as a recording medium that records and saves information of a computer or the like. For example, as a magnetic tape drive that records digital data by using the magnetic tape, an LTO (Liner Tape Open) drive or the like is widely spread.

In the magnetic tape drive, recording and reproduction of data on the magnetic tape are performed by a magnetic head. Then, to perform the correct recording and reproduction of the data to the magnetic tape, the magnetic tape is preferably positioned accurately with respect to the magnetic head. Also, by accurately positioning the magnetic tape, it is possible to further improve a recording density of information recorded on the magnetic tape. If the positioning of the magnetic tape with respect to the magnetic head is not correct and travelling of the magnetic tape meanders with respect to the magnetic head, a fault may occur in the correct recording and reproduction of the data. Also, it is difficult to improve the recording density of the information recorded on the magnetic tape.

To accurately carrying out the positioning of the magnetic tape, a stationary guide, a roller guide, and the like are proposed as a mechanism for carrying out the positioning of the magnetic tape with respect to the magnetic head. The stationary guide is used for adjusting a position in a direction orthogonal to a travelling direction of the magnetic tape with respect to the magnetic head (hereinafter, which will be referred to as "width direction of the magnetic tape") to guide the magnetic tape to the magnetic head. Furthermore, if the magnetic tape is directly fed to the stationary guide, a friction between the stationary guide and the magnetic tape becomes severe because of an angle of the magnetic tape or the like, and the magnetic tape may have a scratch. In view of the above, the roller guide is used for feeding the magnetic tape by using the rollers and adjusting the angle or the like towards the stationary guide to guide the magnetic tape to the stationary guide.

The roller guide generally has a structure in which the roller that rotates in the travelling direction of the magnetic tape are nipped between flanges functioning as stationary positioning parts to suppress a displacement in the width direction of the magnetic tape. For example, a structure is adopted in which the flanges that are disc-like plates mutually fixed by a shaft of the roller are arranged in both ends of the tubular roller.

For the magnetic tape drive, a related art technology of sucking medium dust in the vicinity of the head by using an impeller provided to a shaft of the rotating magnetic head is proposed. Also, a related art technology of removing dust of an edge part of the tape guide through suction by providing a suction nozzle in the vicinity of the edge of the tape guide is proposed.

See Japanese Laid-open Patent Publication No. 10-340432, Japanese Laid-open Patent Publication No. 63-247909, Japanese Laid-open Patent Publication No. 8-180408, and Japanese Laid-open Patent Publication No. 53-118017.

However, when the magnetic tape travels on the roller of the guide roller, an edge part in the width direction of the magnetic tape (hereinafter, which will be referred to as "tape edge") may be in friction with the stationary flange. In this case, it is conceivable that dust generated through the friction between the tape edge and the flange scatters towards the magnetic tape side. Then, the scattered dust adheres to the magnetic tape, and the magnetic head performs the recording or reproduction with respect to the magnetic tape to which the dust adheres, which may lead to a data check fault. In this manner, if the dust generated in the guide roller is not removed, a quality of operations such as the recording and reproduction of the data in the magnetic tape apparatus is unstable.

Also, according to the related art technology of sucking the dust in the vicinity of the head by using the impeller, it is difficult to remove dust generated at a location other then the vicinity of the head such as the dust generated through the friction between the flange and the magnetic tape, and it is difficult to stabilize the operation quality of the magnetic tape apparatus. Furthermore, if the impeller rotates in one direction, the dust may be removed. However, during the backward rotation because of a rewind of the tape or the like, the air blows back, and the dust may be generated by contraries. In view of this too, it is difficult to stabilize the operation quality. Also, according to the related art technology of removing the dust at the edge part of the tape guide by providing the suction nozzle in the vicinity of the edge of the tape guide through the suction, the mechanism for carrying out the vacuum suction is used, and costs increase.

SUMMARY

According to an aspect of the embodiment, a magnetic tape apparatus includes a motor configured to perform a forward rotation and a backward rotation, reel a magnetic tape during one of the forward and backward rotations, and feed the magnetic tape during the other of the forward and backward rotations, a roller guide configured to adjust a travelling direction of the magnetic tape while the magnetic tape is fed by a roller, a head configured to perform read and write of data on the magnetic tape the travelling direction of which is adjusted by the roller guide, a blade arranged on a rotatable shaft of the motor and configured to rotate in conjunction with a rotation of the motor, a first suction tube that serves as a tube that couples the blade with an edge part of the roller of the roller guide and has a blade side opening area at a location where air is sucked by the blade during the forward rotation, a second suction tube that serves as a tube that couples the blade with the edge part of the roller of the roller guide and has a blade side opening area at a location where air is sucked by the blade during the backward rotation, a shutter unit configured to perform opening and closing of the first and second suction tubes, and an opening and closing control unit configured to control the shutter unit to open the first suction tube during the forward rotation and open the second suction tube during the backward rotation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a flow chart of an operation by the LTO drive according to the embodiment.

FIG. 14 is a flow chart of an operation on a file reel side in a data read processing and a data write processing.

FIG. 15 is a flow chart of an operation on the file reel side in a rewind processing.

DESCRIPTION OF EMBODIMENT

Hereinafter, a magnetic tape apparatus and a magnetic tape apparatus control method according to an embodiment disclosed in the present application will be described in detail on the basis of the drawings. It is noted that the following embodiment does not restrict the magnetic tape apparatus and the magnetic tape apparatus control method disclosed in the present application.

First Embodiment

Figure 1:
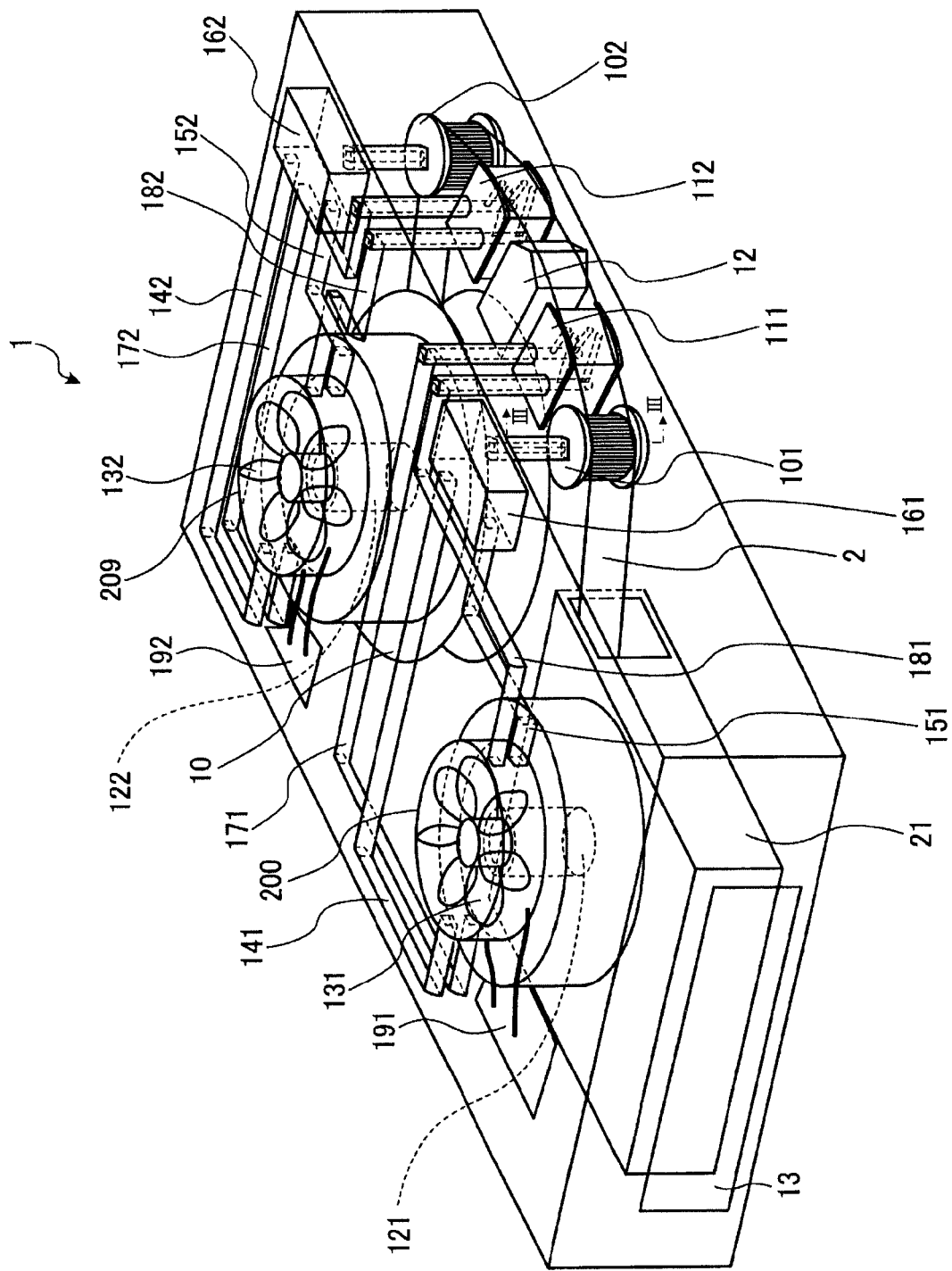
FIG. 1 is a transparent perspective view of an LTO drive according to an embodiment.

FIG. 1 is a transparent perspective view of an LTO drive according to an embodiment. In FIG. 1, a tape cartridge 21 having a magnetic tape 2 is inserted in an LTO drive 1, and further, a state is established in which the magnetic tape 2 is pulled out, and read or write may be performed.

The LTO drive 1 includes a machine reel 10, a head 12, an insertion inlet 13, roller guides 101 and 102, stationary guides 111 and 112, a file reel motor 121, a machine reel motor 122, and blades 131 and 132. Furthermore, the LTO drive 1 includes air intake ducts 141, 142, 151, and 152, filters 161 and 162, and exhaust air ducts 171, 172, 181, and 182. Furthermore, the LTO drive 1 includes controllers 191 and 192, an external cover 200 that covers the blade 131, and an external cover 209 that covers the blade 132. Herein, in FIG. 1, for convenience of the description, only the external covers 200 and 209 are described as the covers for the blades 131 and 132, but in actuality, as will be described below, the covers for the blades 131 and 132 have a three-layer structure.

The tape cartridge 21 includes the magnetic tape 2 and a file reel that reels the magnetic tape 2. The magnetic tape 2 is accommodated in the tape cartridge 21 by being all reeled up by the file reel. Also, in a case where data read or write is performed, the magnetic tape 2 is pulled off from the tape cartridge 21 while passing through the roller guides 101 and 102, the stationary guides 111 and 112, the head 12, and the like to be reeled up by the machine reel 10 of the LTO drive 1.

Figure 2A:
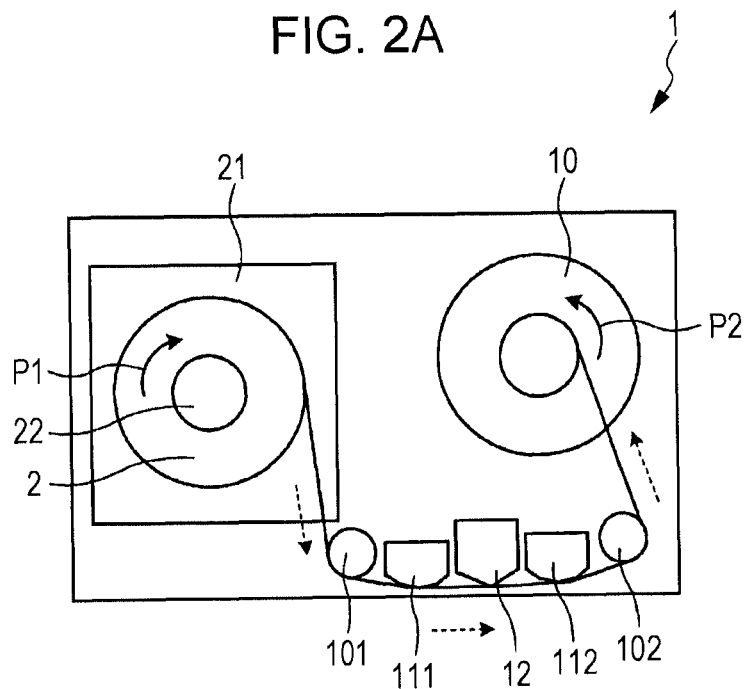
FIG. 2A is an explanatory diagram for describing a movement of a magnetic tape during data read and write operations.
Figure 2B:
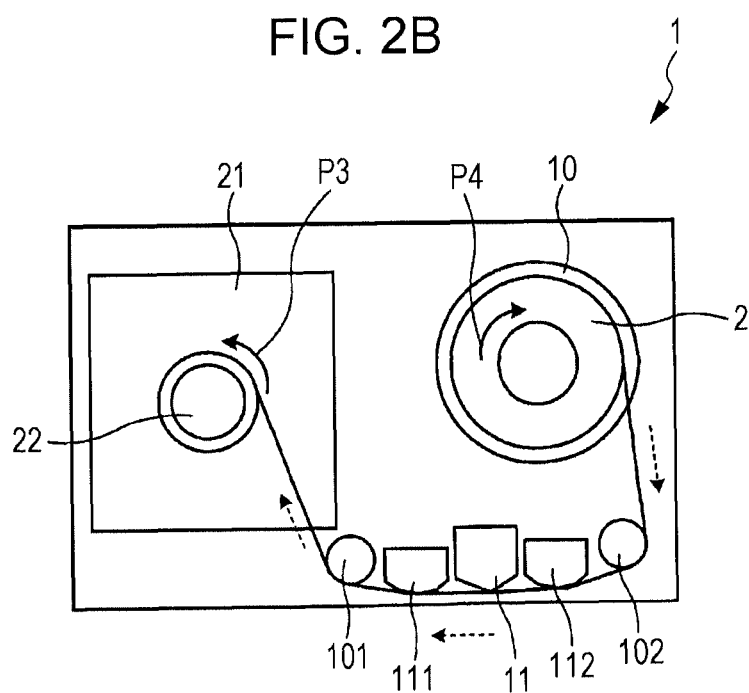
FIG. 2B is an explanatory diagram for describing a movement of the magnetic tape during rewinding.

With reference to FIG. 2A and FIG. 2B, a movement of the magnetic tape 2 during data read and write operations and a movement of the magnetic tape 2 during rewinding will be described. Herein, the rewinding indicates a rewind of the magnetic tape 2 to the tape cartridge 21. FIG. 2A is an explanatory diagram for describing the movement of the magnetic tape during the data read and write operations. Also, FIG. 2B is an explanatory diagram for describing the movement of the magnetic tape during rewinding.

As illustrated in FIG. 2A and FIG. 2B, the magnetic tape 2 extending from the file reel 22 passes through the roller guide 101, the stationary guide 111, the head 12, the stationary guide 112, and the roller guide 102 in the stated order to be reeled up by the machine reel 10. As illustrated in FIG. 2A, during the data read and write operations, the file reel 22 rotates in an arrow P1 direction, and the machine reel 10 rotates in an arrow P2 direction. Hereinafter, in both the machine reel 10 and the file reel 22, a clockwise rotation (in FIG. 2A, a rotation in the P1 direction) is referred to as "forward rotation", and a counterclockwise rotation is referred to as "backward rotation". That is, during the data read and write operations, the file reel 22 performs the forward rotation to feed the magnetic tape 2, and the machine reel 10 performs the backward rotation to reel the magnetic tape 2. At this time, the magnetic tape 2 travels in a direction represented by a dotted line arrow of FIG. 2A. In contrast to this, during rewinding, the file reel 22 rotates in a direction of an arrow P3, and the machine reel 10 rotates in a direction of an arrow P4. That is, during rewinding, the file reel 22 performs the backward rotation to reel the magnetic tape 2, and the machine reel 10 performs the forward rotation to feed the magnetic tape 2.

A reference is made to FIG. 1 again. The insertion inlet 13 is an inlet to which the tape cartridge 21 is inserted. The tape cartridge 21 is inserted from the insertion inlet 13, and the file reel is mounted to the file reel motor 121. After that, the LTO drive 1 pulls out the magnetic tape 2 from the tape cartridge 21 to be passed through the roller guide 101, the stationary guide 111, the head 12, the stationary guide 112, and the roller guide 102 in the stated order and delivered to the machine reel 10.

The roller guide 101, the stationary guide 111, the head 12, the stationary guide 112, and the roller guide 102 are disposed, for example, as illustrated in FIG. 1, from the file reel towards the machine reel 10.

The roller guide 101 changes the travelling direction of the magnetic tape 2 fed from the file reel into a stationary guide 111 direction during the data read and write operations. Then, the roller guide 101 feeds the magnetic tape 2 to the stationary guide 111. In contrast to this, during rewinding, the roller guide 101 changes the direction of the magnetic tape 2 that has passed through the stationary guide 111 into a file reel direction. Then, the roller guide 101 feeds the magnetic tape 2 to the file reel.

Figure 3:
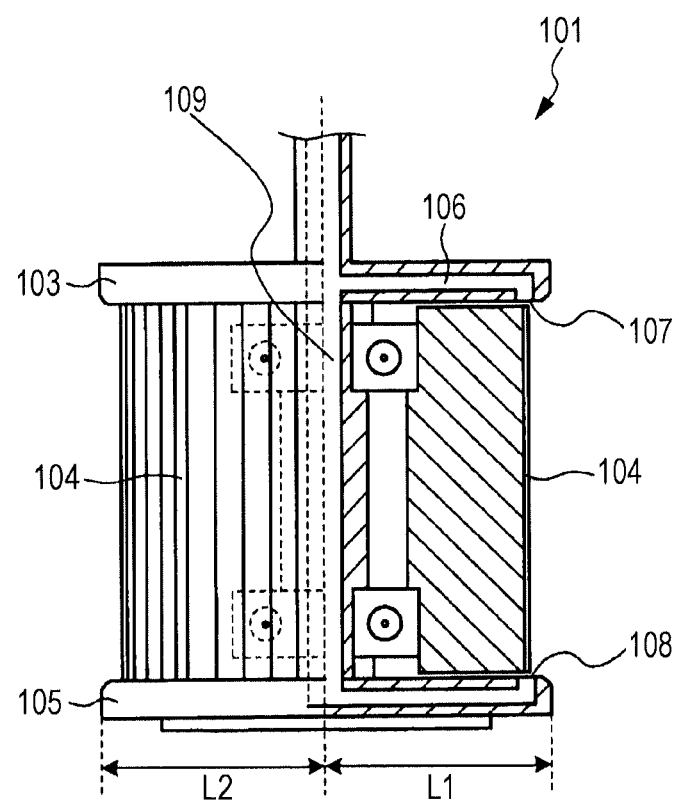
FIG. 3 is an explanatory diagram for describing a structure of a roller guide.

FIG. 3 is an explanatory diagram for describing a structure of the roller guide. An illustration included in a range L1 in FIG. 3 is a cross sectional view of FIG. 1. Also, an illustration included in a range L2 in FIG. 3 is a transparent side view of the roller guide 101. A dotted line in a part included in the range L2 in FIG. 3 is an originally invisible part from the outside, but the illustration is made by using the dotted line for convenience of the description.

The roller guide 101 includes flanges 103 and 105 and a roller 104. The roller 104 rotates about a shaft 109. The travelling direction of the magnetic tape 2 is changed when the magnetic tape 2 contacts the roller 104. Then, the roller 104 rotates because of a friction with the magnetic tape 2, and the magnetic tape 2 is fed in the direction of the stationary guide 111.

The flanges 103 and 105 are connected with each other by the shaft 109. Then, the flange 103, the shaft 109, and the flange 105 are fixed. Furthermore, the flange 103, the shaft 109, and the flange 105 are provided with a vent pile 106. The vent pile 106 is connected with the filter 161 that is led to the air intake ducts 141 and 151 which will be described below. Then, an intake air inlet 107 of the vent pile 106 is provided at a position where the flange 103 contacts the roller 104. Also, an intake air inlet 108 of the vent pile 106 is provided at a position where the flange 105 contacts the roller 104. The intake air inlet 107 and the intake air inlet 108 have a diameter of $\phi 1$ to 2 when, for example, a width of the roller 104 is 12.5 mm. Also, the intake air inlet 107 and the intake air inlet 108 are preferably provided at an end part of the roller 104 at a position where the magnetic tape 2 contacts the roller 104.

The air in the vent pile 106 is sucked towards the filter 161. With this configuration, the air around the intake air inlet 107 and the intake air inlet 108 is sucked from the intake air inlet 107 and the intake air inlet 108. The magnetic tape 2 that travels on the roller 104 contacts the flange 103 and the flange 105. From the friction between the magnetic tape 2 and the flange 103 and the flange 105, dust is generated. That is, the dust is generated in the vicinity of the intake air inlet 107 and the intake air inlet 108. In view of the above, the intake air inlet 107 and the intake air inlet 108 suck the dust together with the surrounding air.

The stationary guide 111 adjusts a position in a direction orthogonal to the travelling direction of the magnetic tape 2 fed from the roller guide 101 during the data read and write operations. Then, the magnetic tape 2 the position of which in the direction orthogonal to the travelling direction is adjusted by the stationary guide 111 passes through the stationary guide 111 and travels towards the head 12. In contrast to this, during rewinding, the stationary guide 111 adjusts a position in a direction orthogonal to the travelling direction of the magnetic tape 2 that has passed through the head 12. Then, the position of which in the direction orthogonal to the travelling direction is adjusted by the stationary guide 111 passes through the stationary guide 111 and travels towards the roller guide 101.

Figure 4A:
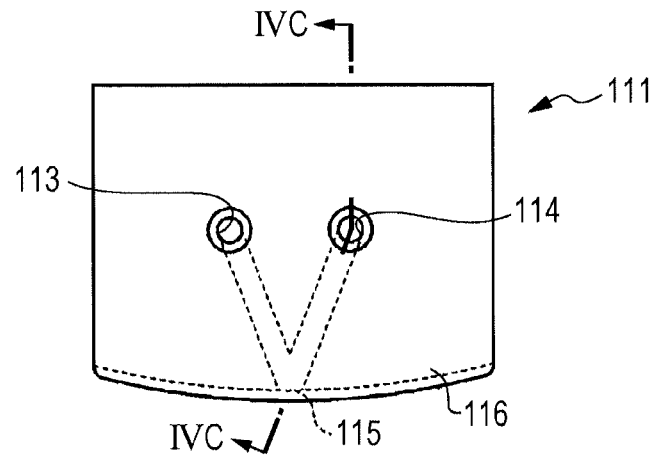
FIG. 4A is a transparent top view of a stationary guide.
Figure 4B:
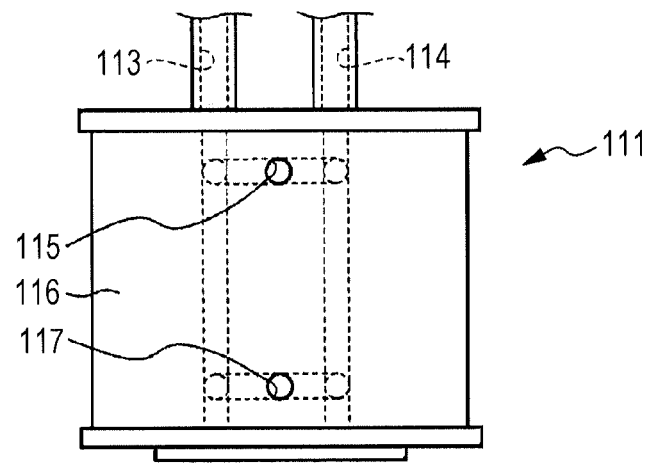
FIG. 4B is a transparent front view of the stationary guide.
Figure 4C:
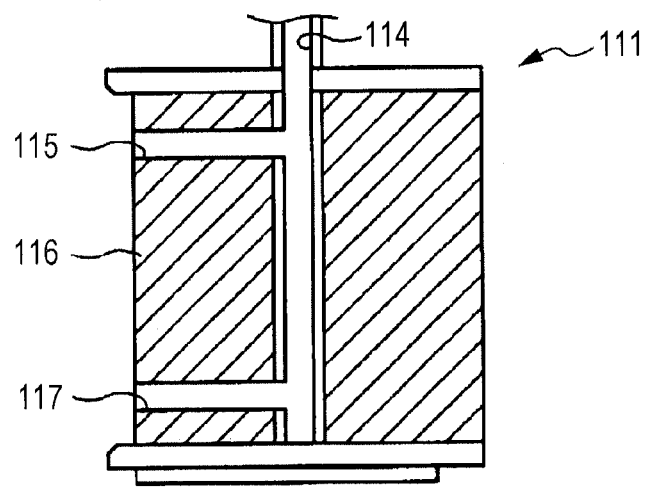
FIG. 4C is an IVC-IVC cross sectional view in FIG. 4A.

FIG. 4A is a transparent top view of the stationary guide. Also, FIG. 4B is a transparent front view of the stationary guide. Also, FIG. 4C is an IVC-IVC cross sectional view in FIG. 4A.

A travelling face 116 is a face that travels with the magnetic tape 2 in contact with the stationary guide 111. The travelling face 116 is provided with an exhaust air inlet 115 and an exhaust air inlet 117 as illustrated in FIG. 4B. Then, a vent tube 113 and a vent tube 114 that are led to the exhaust air inlet 115 and the exhaust air inlet 117 are provided inside the stationary guide 111 as illustrated in FIGS. 4A to 4C. The vent tube 113 is connected with the exhaust air duct 181 which will be described below. Also, the vent tube 114 is connected with the exhaust air duct 171 which will be described below.

The air is pushed out from the exhaust air duct 171 towards the vent tube 114. With this configuration, the air is exhausted from the exhaust air inlet 115 and the exhaust air inlet 117. Also, the air is pushed out from the exhaust air duct 181 towards the vent tube 113. With this configuration too, the air is exhausted from the exhaust air inlet 115 and the exhaust air inlet 117. In this manner, by exhausting the air from the exhaust air inlet 115 and the exhaust air inlet 117, the magnetic tape 2 is pushed in a direction away from the travelling face 116. Since the magnetic tape 2 is pushed by the air in this manner, a frictional force between the magnetic tape 2 and the travelling face 116 is suppressed. With this configuration, it is possible to suppress a wear of the guide. Also, it is possible to suppress degradation in the magnetic tape 2.

The head 12 reads out the data from the fed magnetic tape 2 during the data read operation. Also the head 12 writes the data on the fed magnetic tape 2 during the data write operation. In contrast to this, during rewinding, the head 12 is in contact with the tape, but the data read and write operations are not performed. At the time of the read and write, the magnetic tape 2 that has passed through the head 12 is fed to the stationary guide 112. At the time of rewinding, the magnetic tape 2 that has passed through the head 12 is fed to the stationary guide 111.

The stationary guide 112 adjusts the position in the direction orthogonal to the travelling direction of the magnetic tape 2 that has passed through the head 12 during the data read and write operations. Then, the magnetic tape 2 the position of which in the direction orthogonal to the travelling direction is adjusted by the stationary guide 112 passes through the stationary guide 112 and travels towards the roller guide 102. In contrast to this, during rewinding, the stationary guide 112 adjusts the position in the direction orthogonal to the travelling direction of the magnetic tape 2 fed from the roller guide 102. Then, the magnetic tape 2 the position of which in the direction orthogonal to the travelling direction is adjusted by the stationary guide 112 passes through the stationary guide 112 and travels towards the head 12.

A structure of the stationary guide 112 is similar to the structure of the stationary guide 111 illustrated in FIGS. 4A to 4C. It is however noted that the vent tube of the stationary guide 112 is led to the exhaust air duct 172 and the exhaust air duct 182.

A structure of the roller guide 102 is similar to the structure of the roller guide 101 illustrated in FIG. 3. It is however noted that the vent tube of the roller guide 102 is led to the filter 162 that is led to the air intake duct 142 and the air intake duct 152.

The machine reel 10 is pulled out from the tape cartridge 21 and reels the magnetic tape 2 that has passed through the roller guides 101 and 102, the stationary guides 111 and 112, and the head 12. The machine reel 10 performs the opposite rotation with respect to the file reel 22 (see FIGS. 2A and 2B).

The file reel 22 of the inserted tape cartridge 21 is mounted to the file reel motor 121. Then, the file reel motor 121 rotates the file reel 22 by its own rotation and performs the rewind and feed of the magnetic tape 2. Also, the rotatable shaft of the file reel motor 121 is coupled to the rotatable shaft of the blade 131. Then, the file reel motor 121 rotates to rotate the blade 131. Also, the rotation of the file reel motor 121 is controlled by a rotation control mechanism provided to a substrate.

The machine reel motor 122 is connected with the machine reel 10. Then, the machine reel motor 122 rotates the machine reel 10 by its own rotation and performs the rewind and feed of the magnetic tape 2. Also, the rotatable shaft of the machine reel motor 122 is coupled to the rotatable shaft of the blade 132. Then, the machine reel motor 122 rotates to rotate the blade 132. Also, the rotation of the machine reel motor 122 is controlled by the rotation control mechanism provided to the substrate.

The air intake duct 141 has one opening area on a lateral face of the external cover 200, and the other end is connected to the filter 161. Also, the air intake duct 151 has one opening area on the lateral face of the external cover 200, and the other end is connected to the filter 161.

The exhaust air duct 171 has one opening area on the lateral face of the external cover 200, and the other end is connected to the vent tube of the stationary guide 111. Also, the exhaust air duct 181 has one opening area on the lateral face of the external cover 200, and the other end is connected to the vent tube of the stationary guide 111.

The air intake duct 142 has one opening area on the lateral face of the external cover 209, and the other end is connected to the filter 162. Also, the air intake duct 152 has one opening area on the lateral face of the external cover 209, and the other end is connected to the filter 162.

The exhaust air duct 172 has one opening area on the lateral face of the external cover 209, and the other end is connected to the vent tube of the stationary guide 112. Also, the exhaust air duct 182 has one opening area on the lateral face of the external cover 209, and the other end is connected to the vent tube of the stationary guide 112.

Details of the air intake ducts 141 and 151 in the external cover 200 and the locations of the opening areas of the exhaust air ducts 171 and 181 will be described below. Also, the air intake ducts 142 and 152 in the external cover 209 and the locations of the opening areas of the exhaust air ducts 172 and 182 will be described below.

The filter 161 is connected to the air intake ducts 141 and 151 and further connected to the vent tube of the roller guide 101. The filter 161 causes the air flowing from the vent tube of the roller guide 101 because of the air intake by the blade 131 to pass through the filter and removes the dust included in the air. Then, the air from which the dust is removed by the filter 161 is sent out to the air intake duct 141 or 151.

The filter 162 is connected to the air intake ducts 142 and 152 and further connected to the vent tube of the roller guide 102. The filter 162 causes the air flowing from the vent tube of the roller guide 102 because of the air intake by the blade 132 to pass through the filter and removes the dust included in the air. Then, the air from which the dust is removed by the filter 162 is sent out to the air intake duct 142 or 152.

The controller 191 includes a processor. Then, the controller 191 controls the linking between the air intake ducts 141 and 151 and the exhaust air ducts 171 and 181 and the space in the vicinity of the blade 131. The control on the linking by the controller 191 between the air intake ducts 141 and 151 and the exhaust air ducts 171 and 181 and the space in the vicinity of the blade 131 will be described in detail below.

The controller 192 includes a processor. Then, the controller 192 controls the linking between the air intake ducts 142 and 152 and the exhaust air ducts 172 and 182 and the space in the vicinity of the blade 132. The control on the linking by the controller 192 between the air intake ducts 142 and 152 and the exhaust air ducts 172 and 182 and the space in the vicinity of the blade 132 will be described in detail below.

Figure 5:
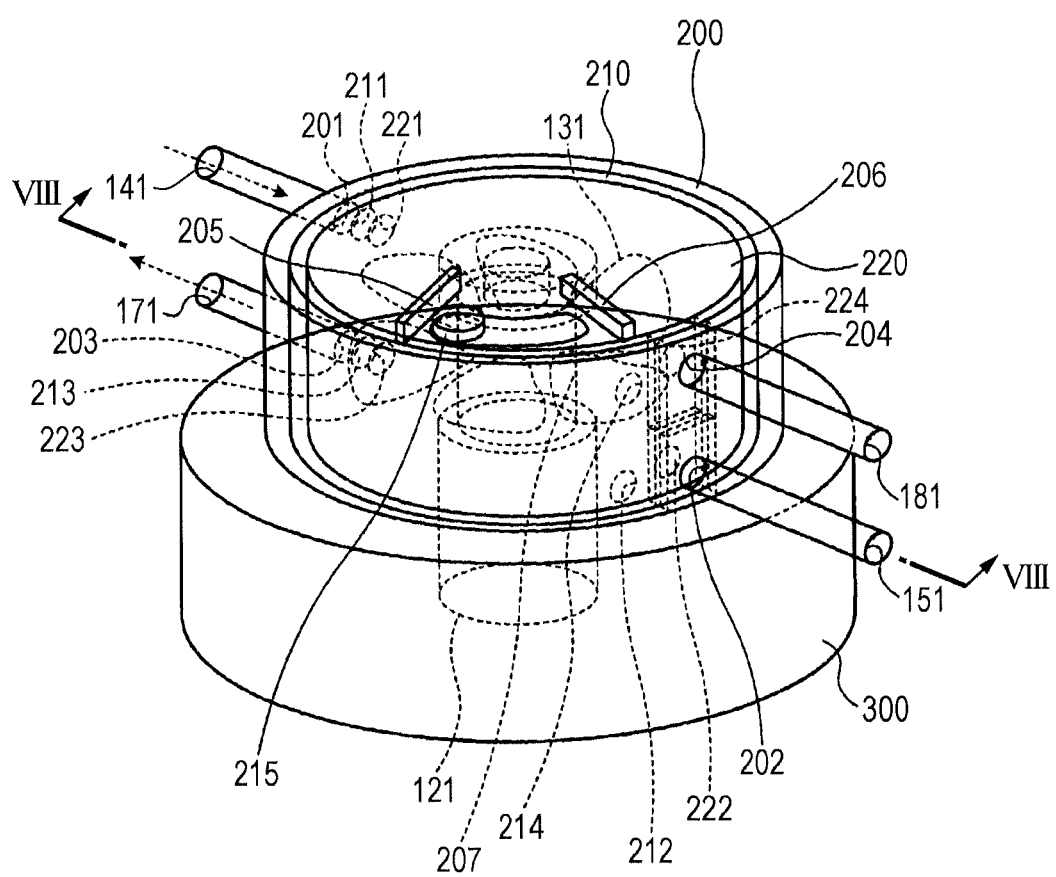
FIG. 5 is an enlarged transparent perspective view of a blade, an external cover, and a file reel motor during a forward rotation.
Figure 6A:
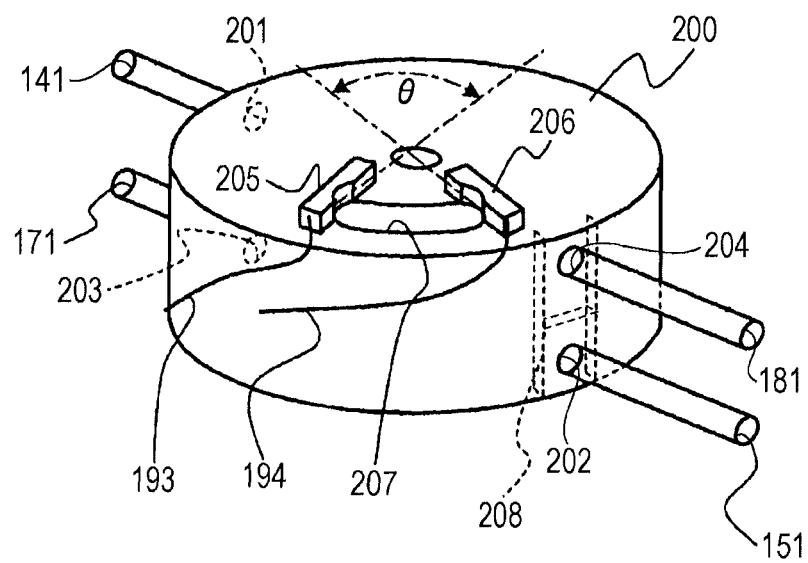
FIG. 6A is a perspective view of the external cover.
Figure 6B:
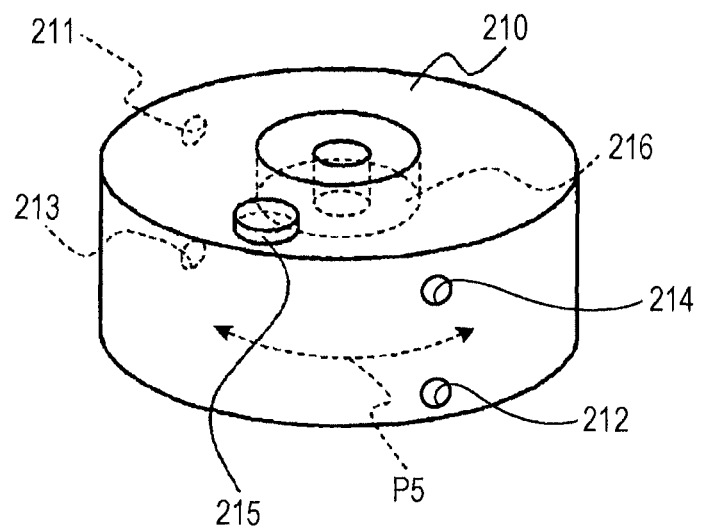
FIG. 6B is a perspective view of a shutter.
Figure 6C:
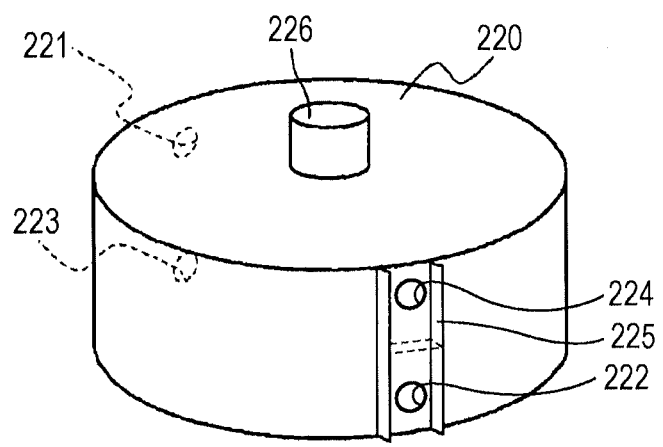
FIG. 6C is a perspective view of an internal cover.
Figure 6D:
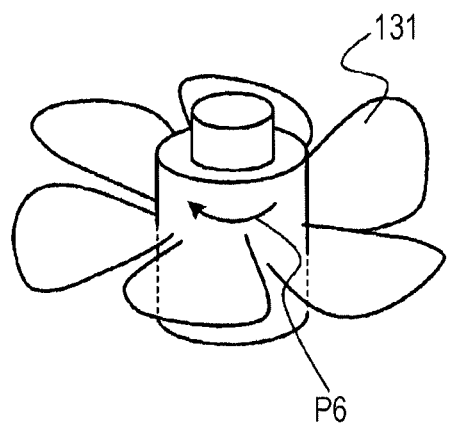
FIG. 6D is a perspective view of the blade.

Next, with reference to FIG. 5 and FIGS. 6A to 6D, the air exhaust and the air intake by the blade 131 will be described. FIG. 5 is an enlarged transparent perspective view of the blade, the external cover, and the file reel motor during the forward rotation. In FIG. 1, only the external cover 200 is described as the cover for the blade 131, but in actuality, as illustrated in FIG. 5, the blade 131 is covered with the external cover 200, a shutter 210, and an internal cover 220. Then, FIG. 6A and FIG. 6B represent an exploded view of the blade 131, the external cover 200, the shutter 210, and the internal cover 220 in FIG. 5. To be more specific, FIG. 6A is a perspective view of the external cover, FIG. 6B is a perspective view of the shutter, FIG. 6C is a perspective view of the internal cover, and FIG. 6D is a perspective view of the blade. In the following description, a motor side as viewed from the blade 131 is referred to as "downward direction", and a direction opposite to the motor as viewed from the blade 131 is referred to as "upward direction".

As illustrated in FIG. 5, the external cover 200 is an outermost cover for the blade 131. The external cover 200 has a tubular shape without having a bottom face in the downward direction. A lower end part of the external cover 200 is fixed to a seating 300 in which the motor and the like are accommodated. Then, as illustrated in FIG. 6A, the external cover 200 has holes 201 to 204 so as to be vertically disposed, for example, at facing positions on the lateral face. To be more specific, according to the present embodiment, the hole 203 is disposed below the hole 201, and at the positions facing those, the hole 202 is disposed below the hole 204. The hole 201 is connected to the air intake duct 141.

Also, the hole 202 is connected to the air intake duct 151. Also, the hole 203 is connected to the exhaust air duct 171. Furthermore, the hole 204 is connected to the exhaust air duct 181. Also, the external cover 200 has an enclosed structure 208 arranged to surround each of the hole 202 and the hole 204 on an inner side wall where the hole 202 and the hole 204 are located and configured to separate the vicinities of the respective holes to interrupt circulation of the air with the external part. The enclosed structure 208 is, for example, a plate-like rubber member. Also, on an inner side wall where the hole 201 and the hole 203 are located, an enclosed structure similar to the enclosed structure 208 is provided.

Furthermore, the external cover 200 has an opening area 207 on a bottom face in the upward direction. The opening area 207 has an opening extending in a circular arc direction of a concentric circle about the rotatable shaft of the motor. To be more specific, for example, the opening area 207 has the opening having a distance at which a center angle θ of the concentric circle about the rotatable shaft of the motor is 30 degrees. Then, electromagnets 205 and 206 are arranged at both end parts of the opening area 207 in the circular arc direction of the concentric circle about the rotatable shaft of the motor. Then, electric wires 193 and 194 are respectively extended from the electromagnets 205 and 206. The electric wires 193 and 194 are connected with the controller 191 which will be described below. Herein, according to the present embodiment, the opening area 207 is set as the opening extending in the circular arc direction of the concentric circle about the rotatable shaft of the motor, but the opening area 207 may adopt another shape so long as a protrusion 215 may be moved in accordance with the rotation of the shutter 210.

As illustrated in FIG. 5, the shutter 210 is a second cover from the outer side of the blade 131. The shutter 210 has a tubular shape without a bottom face in the downward direction. A lower end part of the shutter 210 is not fixed to the seating 300. Then, as illustrated in FIG. 6B, a cylindrical bearing 216 is provided on an inner side of the bottom face of the shutter 210 in the upward direction. A protrusion 226 of the internal cover 220 in FIG. 6C which will be described below is inserted into a cavity on an inner side of the bearing 216. Then, the shutter 210 is supported from beneath by the internal cover 220 in a state in which the bearing 216 is in contact with the internal cover 220. With this configuration, the shutter 210 may rotate about the cavity on the inner side of the bearing 216 in a direction of an arrow P5.

Also, in the shutter 210, the protrusion 215 extending towards the external cover 200 side on the outer side of the bottom face in the upward direction is provided at a location matched with the opening area 207 of the external cover 200. The protrusion 215 is ferromagnetic. The protrusion 215 passes through the opening area 207 penetrates into the bottom face in the upward direction of the external cover 200. When the electromagnet 205 or the electromagnet 206 of the external cover 200 is energized and magnetic force is generated, the protrusion 215 is attracted to the electromagnet on the side where the magnetic force is generated. Since the protrusion 215 is attracted to the electromagnet 205 or 206, the shutter 210 rotates about the cavity on the inner side of the bearing 216 in the direction of the arrow P5 on the side where the protrusion 215 is attracted.

Furthermore, the shutter 210 is provided with holes 211 to 214 on a lateral face. To be more specific, according to the present embodiment, the hole 213 is disposed below the hole 211, and the hole 212 is disposed below the hole 214. Then, the hole 211 and the hole 213 are arranged at positions matched with the hole 201 and the hole 203 in the state in which the protrusion 215 is in contact with the electromagnet 205. Furthermore, the hole 214 and the hole 212 are shifted from the positions facing the hole 211 and the hole 213 by an angle at which the protrusion 215 rotates. According to the present embodiment, the hole 214 and the hole 212 are arranged at positions shifted by 30 degrees from the positions facing the hole 211 and the hole 213. In other words, the hole 214 and the hole 212 are arranged at positions matched with the hole 204 and the hole 203 in the state in which the protrusion 215 is in contact with the electromagnet 206.

Then, in the state in which the protrusion 215 is in contact with the electromagnet 206, the hole 214 is located within a region surrounding the hole 204 of the enclosed structure 208. Also, the hole 212 is located within a region surrounding the hole 202 of the enclosed structure 208. With this configuration, the air in the space connecting the hole 214 to the hole 204 and the air in the space connecting the hole 212 to the hole 202 are not leaked to the external part in the structure. Similarly, in the state in which the protrusion 215 is in contact with the electromagnet 205, the hole 211 is located within the enclosed structure surrounding the hole 201, and the hole 213 is located within the enclosed structure surrounding the hole 203. With this configuration, the air in the space connecting the hole 211 to the hole 201 and the air in the space connecting the hole 213 to the hole 203 are not leaked to the external part in the structure.

As illustrated in FIG. 5, the internal cover 220 is an innermost cover for the blade 131. The internal cover 220 has a cylindrical shape without having a bottom face in the downward direction. A lower end part of the internal cover 220 is fixed to the seating 300.

Also, as illustrated in FIG. 6C, the internal cover 220 has the protrusion 226 extending towards the shutter 210 on the outer side of the bottom face in the upward direction. The protrusion 226 is provided at a position to be fit to the cavity on the inner side of the bearing 216 of the shutter 210. Then, the bottom face in the upward direction of the internal cover 220 contacts the bearing 216 in a state in which the protrusion 226 penetrates through the cavity on the inner side of the bearing 216 and supports the shutter 210 so as to be rotatable about the protrusion 226.

Also, the internal cover 220 has holes 221 to 224 at locations of a lateral face matching with the holes 201 to 204 of the external cover 200. Furthermore, the internal cover 220 has an enclosed structure 225 arranged to surround each of the hole 224 and the hole 222 on an outer side wall where the hole 202 and the hole 204 are located and configured to separate the vicinities of the respective holes to interrupt circulation of the air with the external part. The enclosed structure 225 is, for example, a plate-like rubber member. Also, on an inner side wall where the hole 221 and the hole 223 are located, an enclosed structure similar to the enclosed structure 225 is provided.

Then, in the state in which the protrusion 215 is in contact with the electromagnet 206, the hole 214 of the shutter 210 is located within a region surrounding the hole 224 of the enclosed structure 225. Also, the hole 212 is located within a region surrounding the hole 222 of the enclosed structure 225. With this configuration, the air in the space connecting the hole 214 to the hole 224 and the air in the space connecting the hole 212 to the hole 222 are not leaked to the external part in the structure. Similarly, in the state in which the protrusion 215 is in contact with the electromagnet 205, the hole 211 is located within the enclosed structure surrounding the hole 221, and the hole 213 is located within the enclosed structure surrounding the hole 223. With this configuration, the air in the space connecting to hole 211 with the hole 221 and the air in the space connecting the hole 213 to the hole 223 are not leaked to the external part in the structure.

The blade 131 is arranged within the internal cover 220 so as to rotate in a circumferential direction of the lateral face of the internal cover 220. Then, the blade is arranged so that in a case where the file reel motor 121 performs the forward rotation, that is, in a case where the blade 131 rotates in a direction of an arrow P6, the blade 131 sends the wind in the downward direction. By contrast, in a case where the file reel motor 121 performs the backward rotation, that is, in a case where the blade 131 rotates in an opposite direction of the arrow P6, the wind is sent in the upward direction.

Then, a state during the forward rotation where the respective members of FIGS. 6A to 6D are combined with each other during the forward rotation becomes the state illustrated in FIG. 5. Herein, the blade 131 is connected with the file reel motor 121. With this configuration, when the file reel motor 121 rotates, the blade 131 rotates in the same direction as the rotation direction of the file reel motor 121.

Figure 7A:
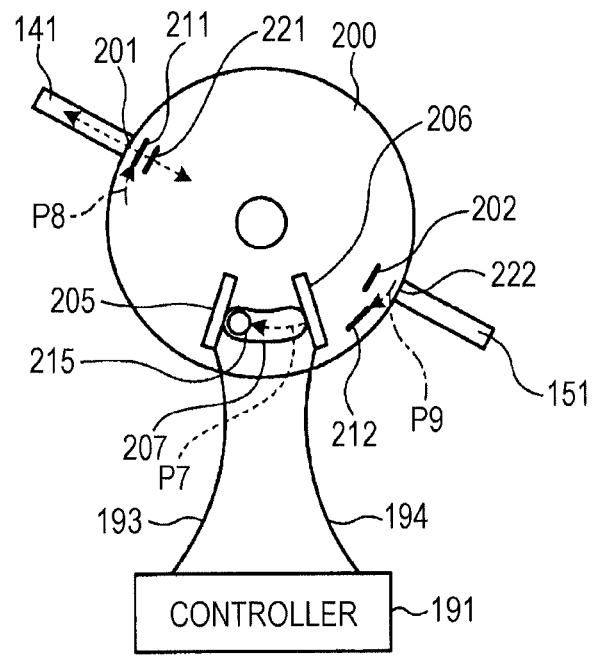
FIG. 7A is an explanatory diagram for describing a state of the shutter during the forward rotation.
Figure 7B:
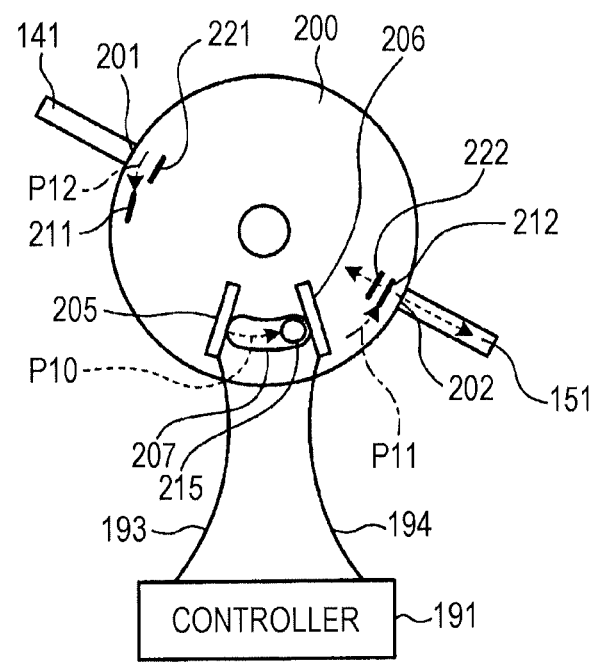
FIG. 7B is an explanatory diagram for describing a state of the shutter during a backward rotation.

Furthermore, a control on the rotation of the shutter 210 will be described by using FIG. 7A and FIG. 7B. FIG. 7A is an explanatory diagram for describing a state of the shutter during the forward rotation. Also, FIG. 7B is an explanatory diagram for describing a state of the shutter during the backward rotation.

The controller 191 is connected with the electromagnet 205 by the electric wire 193. Also, the controller 191 is connected with the electromagnet 206 by the electric wire 194. The controller 191 electrifies the electromagnet 205 via the electric wire 193 to generate magnetic force from the electromagnet 205. Also, the controller 191 electrifies the electromagnet 206 via the electric wire 194 to generate magnetic force from the electromagnet 206.

Then, the controller 191 obtains information from a substrate that controls the rotation of the file reel motor 121 as to whether the file reel motor 121 performs the forward rotation or the backward rotation.

In a case where the file reel motor 121 performs the forward rotation, the controller 191 electrifies the electromagnet 205. In this case, the magnetic force is generated from the electromagnet 205. When the magnetic force is generated from the electromagnet 205, the protrusion 215 of the shutter 210 rotates clockwise as represented by an arrow P7 to contact the electromagnet 205. At this time, the hole 211 of the shutter 210 rotates clockwise as represented by an arrow P8 to be aligned with the hole 201 of the external cover 200 and the hole 221 of the internal cover 220. With this configuration, the space in the vicinity of the blade 131 is linked with the space of the air intake duct 141. Also, the hole 212 of the shutter 210 rotates clockwise as represented by an arrow P9 to be away from the aligning position to the hole 202 of the external cover 200 and the hole 222 of the internal cover 220. With this configuration, the space in the vicinity of the blade 131 is separated from the space of the air intake duct 151. Herein, in FIG. 7A, for convenience of the description, only the holes led to the air intake ducts 141 and 151 are illustrated, but the same applies to the holes led to the exhaust air ducts 171 and 181.

By contrast, in a case where the file reel motor 121 performs the backward rotation, the controller 191 electrifies the electromagnet 206. In this case, the magnet force is generated from the electromagnet 206. When the magnet force is generated from the electromagnet 206, the protrusion 215 of the shutter 210 rotates counterclockwise as represented by an arrow P10 to contact the electromagnet 206. At this time, the hole 212 of the shutter 210 rotates counterclockwise as represented by an arrow P11 to be aligned with the hole 202 of the external cover 200 and the hole 222 of the internal cover 220. With this configuration, the space in the vicinity of the blade 131 is linked with the space of the air intake duct 151. Also, the hole 211 of the shutter 210 rotates counterclockwise as represented by an arrow P12 to be away from the aligning position to the hole 201 of the external cover 200 and the hole 221 of the internal cover 220. With this configuration, the space in the vicinity of the blade 131 is separated from the space of the air intake duct 141. In FIG. 7B too, for convenience of the description, only the holes led to the air intake ducts 141 and 151 are illustrated, but the same applies to the holes led to the exhaust air ducts 171 and 181.

In this manner, a state in which the electromagnet 205 is electrified by the controller 191 during the forward rotation and the shutter 210 rotates clockwise is the state of FIG. 5. In FIG. 5 illustrating the state during the forward rotation, as described above, the holes 201, 211, and 221 are aligned to each other, and the space in the vicinity of the upper part of the blade 131 is linked with the air intake duct 141. Also, the holes 203, 213, and 223 are aligned to each other, and the space in the vicinity of the lower part of the blade 131 is linked with the exhaust air duct 171. In contrast to this, the hole 202 is away from the aligning position to the holes 212 and 222, and the space in the vicinity of the lower part of the blade 131 is separated from the air intake duct 151 by the shutter 210. Also, the hole 204 is away from the aligning position to the holes 214 and 224, and the space in the vicinity of the upper part of the blade 131 is separated from the exhaust air duct 181 by the shutter 210.

Herein, according to the present embodiment, in the external cover 200, the shutter 210, and the internal cover 220, the holes are vertically provided at the facing positions, but these positions may be other positions. For example, a relationship between the holes 201 and 203 and the holes 202 and 204 may not be the facing positions. Also, the alignment of the holes 201 and 203 and the alignment of the holes 202 and 204 may not be the vertical alignment.

Figure 8:
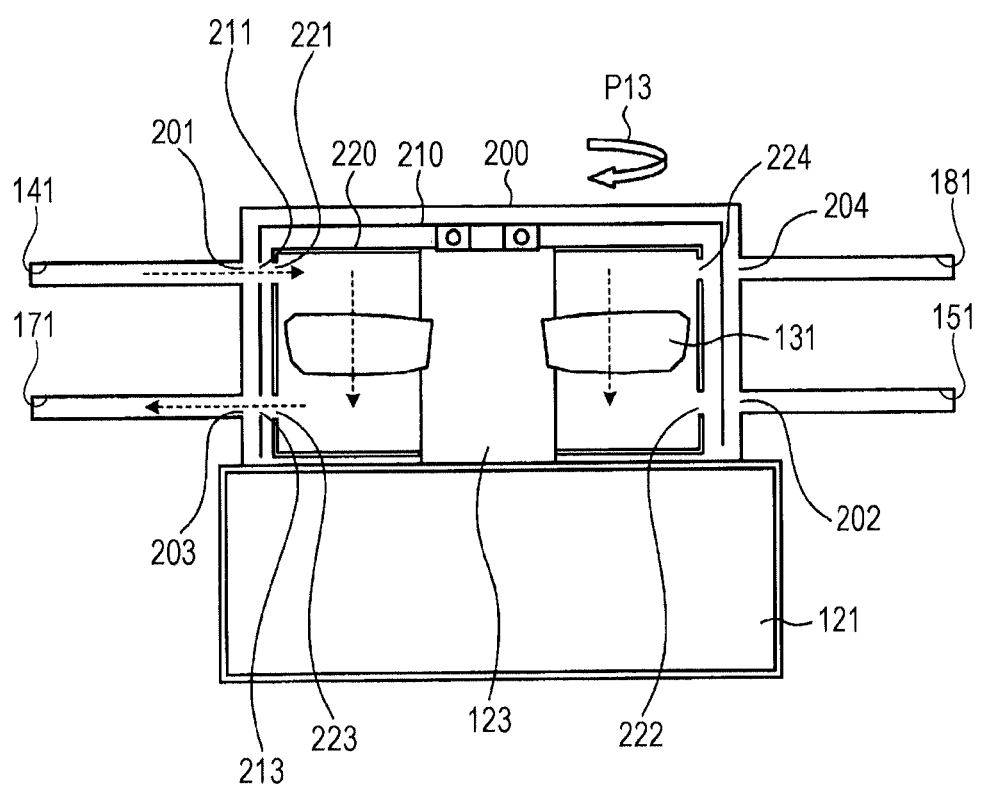
FIG. 8 is a VIII-VIII cross sectional view in FIG. 5.

Next, with reference to FIG. 8, a flow of the air generated by the blade 131 during the forward rotation will be described. FIG. 8 is a VIII-VIII cross sectional view in FIG. 5.

In a case where the file reel motor 121 performs the forward rotation, since a shaft 123 performs the forward rotation in conjunction with the rotation of the file reel motor 121, the blade 131 also performs the forward rotation. In this case, the blade 131 rotates in a direction of an arrow P13. When the blade 131 performs the forward rotation, a flow of the air is generated from the upper part of the blade 131 towards the lower part. At this time, the air in the air intake duct 141 is sucked into the internal cover 220. With this configuration, the air in the vicinity of the opening area on the other end side of the air intake duct 141 provided to the roller guide 101 is sucked. Also, the air in the internal cover 220 is sent out towards the exhaust air duct 171. With this configuration, the air is exhausted from the opening area on the other end side of the exhaust air duct 171 provided to the stationary guide 111.

On the other hand, since the space connecting the hole 224 of the internal cover 220 to the hole 204 of the external cover 200 is interrupted by the shutter 210, the air in the internal cover 220 is not sucked from the hole 224. With this configuration, during the forward rotation, the air is sucked from the opening area of the exhaust air duct 181 provided to the stationary guide 111, and it is possible to avoid the stiction of the magnetic tape 2 onto the stationary guide 111. Similarly, since the space connecting the hole 222 of the internal cover 220 to the hole 202 of the external cover 200 is interrupted by the shutter 210, the air in the internal cover 220 is not sent out from the hole 222. With this configuration, during the forward rotation, the air is exhausted from the opening area of the air intake duct 141 provided to the roller guide 101, and it is possible to avoid the scattering of the dust to the roller guide 101.

Figure 9:
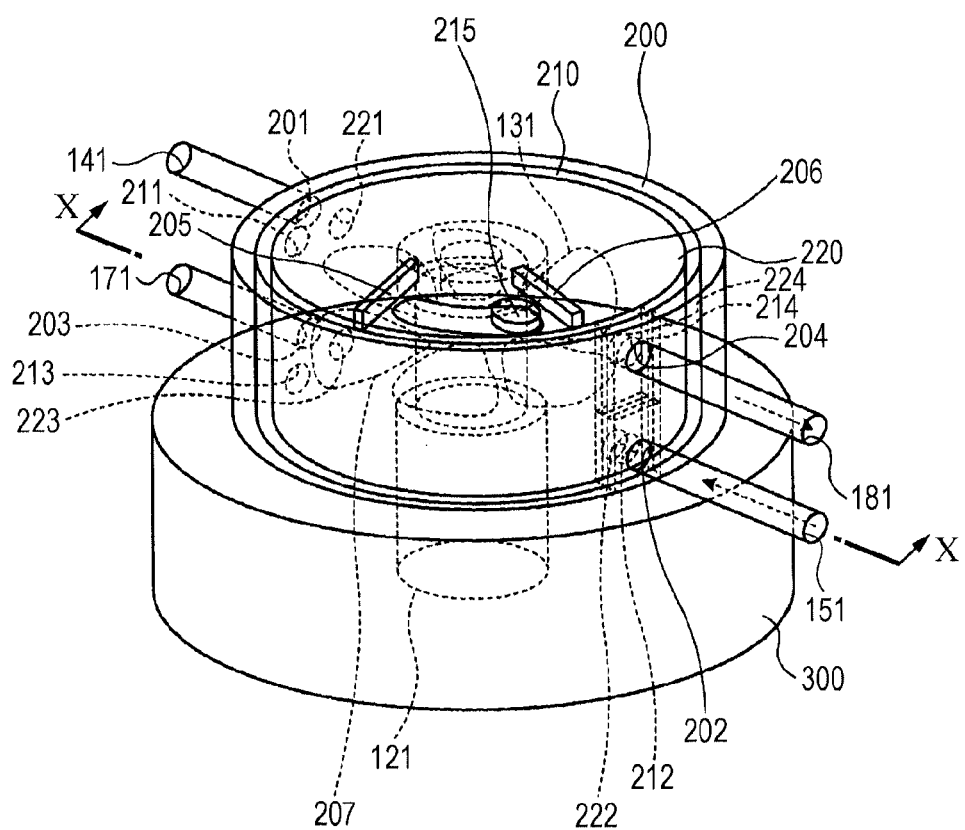
FIG. 9 is an enlarged transparent perspective view of the blade, the external cover, and the file reel motor during the backward rotation.

FIG. 9 is an enlarged transparent perspective view of a blade, an external cover, and a file reel motor during the backward rotation. FIG. 9 illustrates a state in which the electromagnet 206 is electrified by the controller 191 during the backward rotation and the shutter 210 rotates counterclockwise. In FIG. 9 illustrating the state during the backward rotation, as described above, the holes 202, 212, and 222 are aligned to each other, and the space in the vicinity of the lower part of the blade 131 is linked with the air intake duct 151. Also, the holes 204, 214, and 224 are aligned to each other, and the space in the vicinity of the upper part of the blade 131 is linked with the exhaust air duct 181. In contrast to this, the hole 201 is away from the aligning position to the holes 211 and 221, and the space in the vicinity of the upper part of the blade 131 is separated from the air intake duct 141 by the shutter 210. Also, the hole 203 is away from the aligning position to the holes 213 and 223, and the space in the vicinity of the lower part of the blade 131 is separated from the exhaust air duct 171 by the shutter 210.

Figure 10:
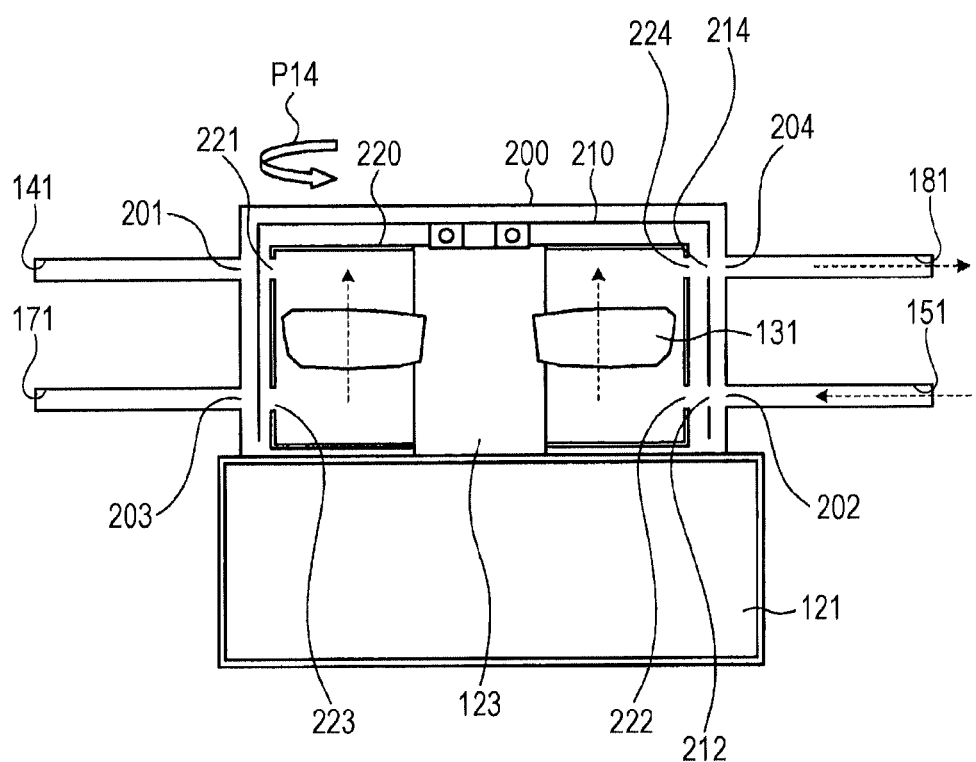
FIG. 10 is an X-X cross sectional view in FIG. 9.

Next, with reference to FIG. 10, a flow of the air generated by the blade 131 during the forward rotation will be described. FIG. 10 is an X-X cross sectional view in FIG. 9.

In a case where the file reel motor 121 performs the backward rotation, since the shaft 123 performs the backward rotation in conjunction with the rotation of the file reel motor 121, the blade 131 also performs the backward rotation. In this case, the blade 131 rotates in a direction of an arrow P14. When the blade 131 performs the backward rotation, a flow of the air is generated from the lower part of the blade 131 towards the upper part. At this time, the air in the air intake duct 151 is sucked into the internal cover 220. With this configuration, the air in the vicinity of the opening area on the other end side of the air intake duct 151 provided to the roller guide 101 is sucked. Also, the air in the internal cover 220 is sent towards the exhaust air duct 181. With this configuration, the air is exhausted from the opening area on the other end side of the exhaust air duct 181 provided to the stationary guide 111.

On the other hand, since the space connecting the hole 223 of the internal cover 220 to the hole 203 of the external cover 200 is interrupted by the shutter 210, the air in the internal cover 220 is not sucked from the hole 223. With this configuration, during the backward rotation, the air is sucked from the opening area of the exhaust air duct 171 provided to the stationary guide 111, and it is possible to avoid the stiction of the magnetic tape 2 onto the stationary guide 111. Similarly, since the space connecting the hole 221 of the internal cover 220 to the hole 201 of the external cover 200 is interrupted by the shutter 210, the air in the internal cover 220 is not sent out from the hole 221. With this configuration, during the backward rotation, the air is exhausted from the opening area of the air intake duct 141 provided to the roller guide 101, and it is possible to avoid the scattering of the dust to the roller guide 101.

In the above, the blade 131, the cover around the blade 131, and the intake air duct and the exhaust air duct extending therefrom have been described, but the above-mentioned structure is similar in the blade 132, the cover for the blade 132, and the intake air duct and the exhaust air duct extending therefrom. It is however noted that the file reel motor 121 performs the opposite rotation with respect to the machine reel motor 122. For that reason, in the duck state of the air intake ducts 142 and 152 and the exhaust air ducts 172 and 182 illustrated in FIG. 1, in a case where the machine reel motor 122 performs the forward rotation, the controller 192 controls the cover for the blade 132 to establish the state illustrated in FIG. 9. On the other hand, in a case where the machine reel motor 122 performs the backward rotation, the controller 192 controls the cover for the blade 132 to establish the state illustrated in FIG. 5. In other words, during the forward rotation, the cover for the blade 132 has the state during the backward rotation of the cover for the blade 131, and during the backward rotation, the cover for the blade 132 has the state during the forward rotation of the cover for the blade 131. It is however noted that another structure may also be adopted. For example, the position of the opening area in the external cover 209 for the air intake ducts 142 and 152 may be switched by the position of the opening area in the external cover 209 for the exhaust air ducts 172 and 182. In this case, the controller 192 performs the control so that the states of the cover for the blade 132 during the forward rotation and during the backward rotation are respectively matched with the states of the cover for the blade 131 during the forward rotation and during the backward rotation. Also, for example, the positions of the opening areas in the external covers 209 for the air intake duct 142 and the exhaust air duct 172 may be switched with each other, and further, the positions of the opening areas in the external cover 209s for the air intake duct 152 and the exhaust air duct 182 may be switched with each other. In this case too, the controller 192 performs the control so that the states of the cover for the blade 132 during the forward rotation and during the backward rotation are respectively matched with the states of the cover for the blade 131 during the forward rotation and during the backward rotation. Furthermore, the blade arrangements for the blade 131 and the blade 132 may be changed to reverse the flow of the air. In that case, the control on the shutter 210 during the forward rotation and the backward rotation is opposite to the present embodiment.

By the flow of the air generated by the blade 132, the dust generated in the roller guide 102 is sucked into the air intake duct 142 or 152, and the air sent from the exhaust air duct 172 or 182 is exhausted from the stationary guide 112.

Figure 11:
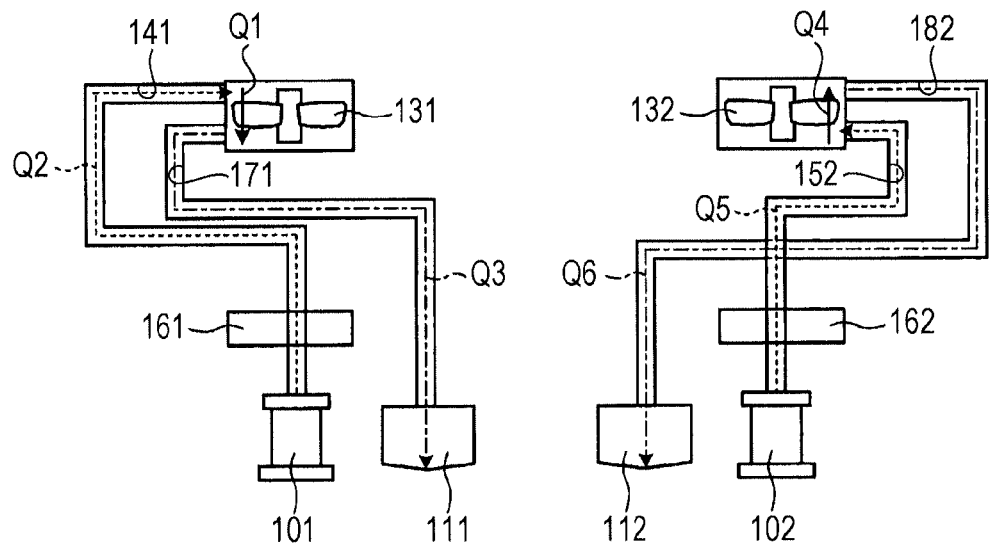
FIG. 11 is a schematic diagram of a flow of the air in the entire LTO drive during the data read and write operations.

Next, with reference to FIG. 11, an entire flow of the air in the LTO drive 1 during the data read and write operations will be described. FIG. 11 is a schematic diagram of a flow of the air in the entire LTO drive during the read and write.

The file reel motor 121 performs the forward rotation during the data read and write operations. In this case, the blade 131 performs the forward rotation and generates a flow of air heading from the air intake duct 141 towards the exhaust air duct 171 as represented by an arrow Q1. With this configuration, the air is sucked from the roller guide 101 towards the blade 131 as represented by an arrow Q2. With this configuration, the dust generated in the roller guide 101 is sucked into the air intake duct 141. At this time, the air flowing as represented by the arrow Q2 passes in midway through the filter 161. Then, the dust sucked into the roller guide 101 is removed by the filter 161. With this configuration, the clean air from which the dust is removed is sent into the blade 131. Furthermore, the clean air sent into the blade 131 is sent into the stationary guide 111 and discharged as represented by an arrow Q3. On the other hand, the machine reel motor 122 performs the backward rotation during the data read and write operations. In this case, the blade 132 performs the backward rotation, and a flow of air heading from the air intake duct 152 towards the exhaust air duct 182 as represented by an arrow Q4 is generated. With this configuration, the air is sucked from the roller guide 102 towards the blade 132 as represented by an arrow Q5. With this configuration, the dust generated in the roller guide 102 is sucked into the air intake duct 152. At this time, the air flowing as represented by the arrow Q5 passes in midway through the filter 162. Then, the dust sucked into the roller guide 102 is removed by the filter 162. With this configuration, the clean air from which the dust is removed is sent into the blade 132. Furthermore, the clean air sent into the blade 132 is sent into the stationary guide 112 and discharged as represented by an arrow Q6.

Figure 12:
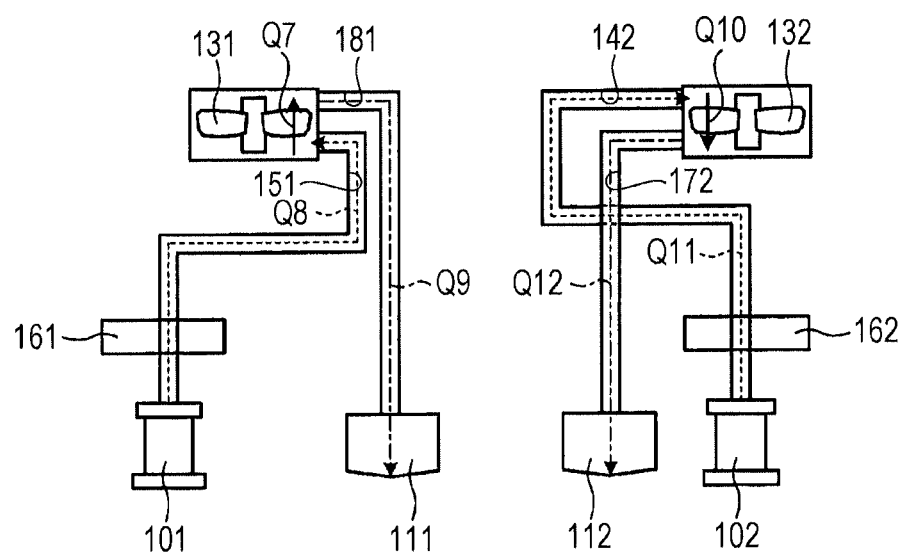
FIG. 12 is a schematic diagram of a flow of the air in the entire LTO drive during rewinding.

Next, with reference to FIG. 12, an entire flow of the air in the LTO drive 1 during rewinding will be described. FIG. 12 is a schematic diagram of a flow of the air in the entire LTO drive during rewinding.

The file reel motor 121 performs the backward rotation during rewinding. In this case, the blade 131 performs the backward rotation and generates a flow of air heading from the air intake duct 151 towards the exhaust air duct 181 as represented by an arrow Q7. With this configuration, the air is sucked from the roller guide 101 towards the blade 131 as represented by an arrow Q8. With this configuration, the dust generated in the roller guide 101 is sucked into the air intake duct 151. At this time, the air flowing as represented by the arrow Q8 passes in midway through the filter 161. Then, the dust sucked into the roller guide 101 is removed by the filter 161. With this configuration, the clean air from which the dust is removed is sent into the blade 131. Furthermore, the clean air sent into the blade 131 is sent into the stationary guide 111 and discharged as represented by an arrow Q9. On the other hand, the machine reel motor 122 performs the forward rotation during rewinding. In this case, the blade 132 performs the forward rotation, and a flow of the air heading from the air intake duct 142 towards the exhaust air duct 172 as represented by an arrow Q10. With this configuration, the air is sucked from the roller guide 102 towards the blade 132 as represented by an arrow Q11. With this configuration, the dust generated in the roller guide 102 is sucked into the air intake duct 142. At this time, the air flowing as represented by the arrow Q11 passes in midway through the filter 162. Then, the dust sucked into the roller guide 102 is removed by the filter 162. With this configuration, the clean air from which the dust is removed is sent into the blade 132. Furthermore, the clean air sent into the blade 132 is sent into the stationary guide 112 and discharged as represented by an arrow Q12.

Next, with reference to FIG. 13, a flow of an operation by the LTO drive according to the present embodiment will be described. FIG. 13 is a flow chart of the operation by the LTO drive according to the embodiment. Herein, the LTO drive 1 is mainly used for data backup in many cases. As a use method, the data is sequentially recorded on the magnetic tape 2, and also, the data recorded on the magnetic tape 2 is directly sequentially read out in many cases. In this regard, also in the LTO drive 1, the data on the magnetic tape 2 may be processed in a skipping manner while advancing and now retreating, but the above-mentioned operation is rare. That is, in the LTO drive 1, when the data read or write is performed and the data read or write processing is completed, a series of operation in which rewinding is performed and the magnetic tape 2 is accommodated in the tape cartridge 21 is carried out in many cases. For this reason, the file reel 22 and the machine reel 10 continue to rotate at a fixed pace since the forward rotation or the backward rotation continues for a certain period of time in many cases. In view of the above, herein, a case in which the rewind does not occur during the read or write operation will be described. Also, a case in which the rewind occurs after the read or write is ended will be described.

An operator inserts the tape cartridge 21 into the insertion inlet 13 of the LTO drive 1 (operation S1).

The file reel 22 of the tape cartridge 21 is mounted to the file reel motor 121 (operation S2). Then, the magnetic tape 2 is pulled out from the tape cartridge 21 to be fed to the machine reel 10 (operation S3).

After that, the LTO drive 1 executes the data read processing or the data write processing (operation S4). At this time, the LTO drive 1, the processing is carried out for the suction of the dust through the air intake and the discharge of the air onto the magnetic tape 2. A detail of the operation for the air suction and the air discharge in the LTO drive 1 during the data read processing and the data write processing will be described below.

The LTO drive 1 determines whether or not the executed processing among the read processing and the write processing is completed (operation S5). In a case where the executed processing is not completed (operation S5: NO), the LTO drive 1 continues the execution of the read processing and the write processing (operation S4). In contrast to this, in a case where the executed processing is completed (operation S5: YES), the LTO drive 1 executes a rewind processing corresponding to a processing of rewinding the magnetic tape 2 (operation S6). At this time, the LTO drive 1, the processing is carried out for the suction of the dust through the air intake and the exhaust of the air onto the magnetic tape 2. A detail of the operation for the air suction and the air discharge in the LTO drive 1 during the rewind processing will be described below.

The LTO drive 1 determines whether or not the rewind of the magnetic tape 2 is completed (operation S7). In a case where the rewind of the magnetic tape 2 is not completed (operation S7: NO), the LTO drive 1 continues the rewind processing (operation S6). In contrast to this, in a case where the rewind of the magnetic tape 2 is completed (operation S7: YES), the LTO drive 1 separates the tape cartridge 21 from the file reel motor 121 (operation S8). After that, the LTO drive 1 discharges the tape cartridge 21 from the insertion inlet 13 (operation S9).

Next, with reference to FIG. 14, an operation on the file reel 22 side in a data read processing and a data write processing will be described. FIG. 14 is a flow chart of the operation on the file reel side in the data read processing and the data write processing.

The file reel motor 121 performs the forward rotation (operation S11). The blade 131 performs the forward rotation (operation S12).

The controller 191 energizes the electromagnet 205 (operation S13). With this configuration, the protrusion 215 of the shutter 210 is attracted to the electromagnet 205 (operation S14).

The holes 211 and 213 of the shutter 210 (which are represented as "holes of the shutters on the forward direction side" in the flow) are aligned with the holes 201 and 203 of the external cover 200 and the holes 221 and 223 of the internal cover 220 (operation S15).

By the forward rotation of the blade 131, the air is sucked from the air intake duct 141 (operation S16). Also, by the forward rotation of the blade 131, the air is exhausted from the exhaust air duct 171 (operation S17). With this configuration, the dust is sucked from the opening area of the roller guide 101 (operation S18). With this configuration, the dust generated in the roller guide 101 is sucked. Also, the air is exhausted from the opening area of the stationary guide 111 (operation S19). With this configuration, pushing force in a direction away from the stationary guide 111 works on the magnetic tape 2.

In the description herein, the operation on the file reel 22 side in the data read processing and the data write processing has been described by using FIG. 14, but since the operation on the machine reel 10 side during rewinding is also an operation similar to the flow of FIG. 14, a description thereof will be omitted.

Next, with reference to FIG. 15, an operation on the file reel 22 side in the rewind processing will be described. FIG. 15 is a flow chart of the operation on the file reel side in the rewind processing.

The file reel motor 121 performs the backward rotation (operation S21). The blade 131 performs the backward rotation (operation S22).

The controller 191 electrifies the electromagnet 206 (operation S23). With this configuration, the protrusion 215 of the shutter 210 is attracted to the electromagnet 206 (operation S24).

The holes 212 and 214 the shutter 210 (which are represented as "holes of the shutter on the opposite direction side" in the flow) are aligned with the holes 202 and 204 of the external cover 200 and the holes 222 and 224 of the internal cover 220 (operation S25).

By the forward rotation of the blade 131, the air is sucked from the air intake duct 151 (operation S26). Also, by the backward rotation of the blade 131, the air is exhausted from the exhaust air duct 181 (operation S27). With this configuration, the dust is sucked from the opening area of the roller guide 101 (operation S28). With this configuration, the dust generated in the roller guide 101 is sucked. Also, the air is exhausted from the opening area of the stationary guide 111 (operation S29). With this configuration, pushing force in a direction away from the stationary guide 111 works on the magnetic tape 2.

In the description herein, the operation on the file reel 22 side in the rewind processing has been described by using FIG. 15, but since the operation on the machine reel 10 side in the data read processing and the data write processing is also an operation similar to the flow of FIG. 15, a description thereof will be omitted.

As described above, with the magnetic tape apparatus and the magnetic tape apparatus control method according to the present embodiment, the flow of the air is switched between the data read and write operations and rewinding operation. With this configuration, irrespective of the travelling direction of the tape, the dust generated in the roller guide is sucked, and the air is blown onto the magnetic tape in the stationary guide. Therefore, the continual removal of the dust and the suppression of the friction between the magnetic tape and the stationary guide may be realized, and it is possible to stabilize the operational quality of the magnetic tape apparatus.

Also, since the blades are arranged on the two motors that perform the feed and rewind of the tape, with the magnetic tape apparatus and the magnetic tape apparatus control method according to the present embodiment, the removal of the dust and the suppression of the friction between the magnetic tape and the stationary guide may be realized in the small space. In addition, with the magnetic tape apparatus and the magnetic tape apparatus control method according to the present embodiment, it is possible to stabilize the quality of the magnetic tape apparatus at low costs without a provision of an expensive pump and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A magnetic tape apparatus comprising:
    a motor configured to perform a forward rotation and a backward rotation, reel a magnetic tape during one of the forward and backward rotations, and feed the magnetic tape during the other of the forward and backward rotations;
    a roller guide configured to adjust a travelling direction of the magnetic tape while the magnetic tape is fed by a roller;
    a head configured to perform read and write of data on the magnetic tape the travelling direction of which is adjusted by the roller guide;
    a blade arranged on a rotatable shaft of the motor and configured to rotate in conjunction with a rotation of the motor;
    a first suction tube that serves as a tube that couples the blade with an edge part of the roller of the roller guide and has a blade side opening area at a location where air is sucked by the blade during the forward rotation;
    a second suction tube that serves as a tube that couples the blade with the edge part of the roller of the roller guide and has a blade side opening area at a location where air is sucked by the blade during the backward rotation;
    a shutter unit configured to perform opening and closing of the first and second suction tubes; and
    an opening and closing control unit configured to control the shutter unit to open the first suction tube during the forward rotation and open the second suction tube during the backward rotation.

2. The magnetic tape apparatus according to claim 1, further comprising:
    a stationary guide positioned between the roller guide and the head and configured to adjust the travelling direction of the magnetic tape;
    a first blower tube that serves as a tube that connects the blade with the stationary guide and has a blade-side opening area at a location where wind blows by the blade during the forward rotation and a guide-side opening area facing a face in contact with the magnetic tape from an inner side of the stationary guide; and
    a second blower tube that serves as a tube that connects the blade with the stationary guide and has a blade-side opening area at a location where wind blows by the blade during the backward rotation and a guide-side opening area facing a face in contact with the magnetic tape from the inner side of the stationary guide, wherein:
    the shutter unit performs opening and closing of the first and second blower tubes; and
    the opening and closing control unit controls the shutter unit to open the first blower tube during the forward rotation and open the second blower tube during the backward rotation.

3. The magnetic tape apparatus according to claim 2, wherein:
    the motor includes a first motor configured to feed the magnetic tape during the forward rotation and reel the magnetic tape during the backward rotation and a second motor configured to reel the magnetic tape during the forward rotation and feed the magnetic tape during the backward rotation;
    the blade includes a first blade provided to the first motor and a second blade provided to the second motor;
    the roller guide includes a first roller guide and a second roller guide on both sides of the head;
    the stationary guide has a first stationary guide arranged between the head and the first roller guide and a second stationary guide arranged between the head and the second roller guide;
    the first suction tube includes a tube that connects the first blade with the first roller guide and a tube that connects the second blade with the second roller guide;
    the second suction tube includes a tube that connects the first blade with the first roller guide and a tube that connects the second blade with the second roller guide;
    the first blower tube includes a tube that connects the first blade with the first stationary guide and a tube that connects the second blade with the second stationary guide; and
    the second blower tube includes a tube that connects the first blade with the first stationary guide and a tube that connects the second blade with the second stationary guide.

4. The magnetic tape apparatus according to claim 1, wherein:
    the shutter unit, which covers the blade, has a columnar shape having a bottom face in a direction of the rotatable shaft of the blade and is rotatable in a circumferential direction, has a first through-hole on one end side of a side face and a second through-hole on the other end side of the side face, and has a ferromagnetic protrusion on an outer side of the bottom face; and the opening and closing control unit rotates the shutter unit by attracting the protrusion by using an electromagnet, matches the first through-hole with the blade side opening area of the first suction tube to open the first suction tube by linking the first suction tube to a space of a surrounding of the blade, and matches the second through-hole with the blade side opening area of the second suction tube to open the second suction tube by linking the second suction tube to the space of the surrounding of the blade.

5. The magnetic tape apparatus according to claims 1, wherein the first suction tube and the second suction tube include an air filter.

6. A magnetic tape apparatus control method, comprising:

reeling, by a motor configured to perform a forward rotation and a backward rotation, a magnetic tape during one of the forward and backward rotations and feeding the magnetic tape during the other of the forward and backward rotations;

adjusting a travelling direction of the magnetic tape while the magnetic tape is fed by a roller;

performing read and write of data on the magnetic tape the travelling direction of which is adjusted;

sucking, by a first suction tube that couples a blade with an edge part of the roller, air at the edge part of the roller through the forward rotation of the blade that rotates in conjunction with the rotation of the motor;

sucking, by a second suction tube that couples the blade with an edge part of the roller, air at the edge part of the roller through the backward rotation of the blade; and opening the first suction tube during the forward rotation and opening the second suction tube during the backward rotation.

* * * * *

UNITED STATES PATENT AND TRADEMARK OFFICE
CERTIFICATE OF CORRECTION

| | |
|---|---|
| PATENT NO. | : 8,537,491 B2 |
| APPLICATION NO. | : 13/654619 |
| DATED | : September 17, 2013 |
| INVENTOR(S) | : Yoshio Kotaki |

It is certified that error appears in the above-identified patent and that said Letters Patent is hereby corrected as shown below:

In the Claims:

In Column 19, Line 11, In Claim 5, delete "claims" and insert -- claim --, therefor.

Signed and Sealed this
Twenty-fourth Day of December, 2013

Margaret A. Focarino
*Commissioner for Patents of the United States Patent and Trademark Office*